United States Patent [19]

Alon et al.

[11] Patent Number: 5,592,444
[45] Date of Patent: Jan. 7, 1997

[54] METHOD OF WRITING DATA SIMULTANEOUSLY ON A PLURALITY OF TRACKS OF AN OPTICAL DISK, AND APPARATUS THEREFOR

[75] Inventors: Amir Alon, Yahud; Shlomo Shapira; Itzhak Katz, both of Petach Tikva, all of Israel

[73] Assignee: Zen Research N.V., Netherlands Antilles

[21] Appl. No.: 254,187

[22] Filed: Jun. 6, 1994

[30] Foreign Application Priority Data

Jun. 14, 1993 [IL] Israel ........................ 106009

[51] Int. Cl.$^6$ .................. G11B 11/00; G11B 7/00
[52] U.S. Cl. .................. 369/13; 369/112; 369/44.23
[58] Field of Search .................. 369/32, 13, 54, 369/58, 44.37, 44.38, 110, 112, 114, 109, 111, 122, 93, 103, 102, 47, 124, 121, 44.14, 44.23; 360/59, 114

[56] References Cited

U.S. PATENT DOCUMENTS

| | | | |
|---|---|---|---|
| 3,748,015 | 7/1973 | Offner | 359/366 |
| 3,805,275 | 4/1974 | Kiemle et al. | 347/236 |
| 4,135,251 | 1/1979 | Ruell | 365/216 |
| 4,298,974 | 11/1981 | Tsunoda et al. | 369/44.38 |
| 4,428,647 | 1/1984 | Sprague et al. | 350/167 |
| 4,486,870 | 12/1984 | Pettigrew et al. | 369/32 |
| 4,536,866 | 8/1985 | Jerome et al. | 369/112 |
| 4,581,529 | 4/1986 | Gordon | 250/227.26 |
| 4,841,514 | 6/1989 | Tsuboi et al. | 369/100 |
| 5,033,043 | 7/1991 | Hayakawa | 369/121 |
| 5,065,387 | 11/1991 | Roth et al. | 369/44.41 |
| 5,081,617 | 1/1992 | Gelbart | 369/112 |
| 5,111,445 | 5/1992 | Psaltis et al. | 369/103 |
| 5,128,919 | 7/1992 | Narahara et al. | 369/97 |
| 5,150,347 | 9/1992 | Yanagi | 369/44.37 |
| 5,181,161 | 1/1993 | Hirose et al. | 369/48 |
| 5,231,627 | 7/1993 | Paul et al. | 369/125 |
| 5,233,583 | 8/1993 | Reno | 369/44.26 |
| 5,247,510 | 9/1993 | Lee et al. | 369/118 |
| 5,253,245 | 10/1993 | Rabedeau | 369/119 |
| 5,258,970 | 11/1993 | Kobayashi | 369/109 |
| 5,265,085 | 11/1993 | Jaquette et al. | 369/99 |

(List continued on next page.)

FOREIGN PATENT DOCUMENTS

| | | |
|---|---|---|
| 0092420 | 10/1979 | European Pat. Off. . |
| 569718 | 11/1993 | European Pat. Off. . |
| 2120001 | 4/1983 | United Kingdom . |

OTHER PUBLICATIONS

D. F. Barbe, "Time delay and integration image sensors", Solid State Imaging, P. G. Jespers et al., Nordhoff, The Netherlands, pp. 659–671 (1976).

"Offnet 1:1 system: some further uses", M. V. R. K. Murtz, Optical Engineering, vol. 24, No. 2, pp. 326–328 (Apr., 1985).

Patent Abstracts of Japan, vol. 12, No. 138 (P–695) 27 Apr. 1988 & JP–A–62 259 239 (Hitachi) 11 Nov. 1987—abstract.

Patent Abstracts of Japan, vol. 9, No. 24 (P–331) 31 Jan. 1985 & JP–A–59 168 942 (Matsushita Denki Sangyo K K) 22 Sep. 1984—abstract.

Patent Abstracts of Japan, vol. 9, No. 86 (P–349) 16 Apr. 1985 & JP–A–59 215 033 (Hitachi Seisakusho K K) 4 Dec. 1984—abstract.

Patent Abstracts of Japan, vol. 14, No. 8 (P–987) 10 Jan. 1990 & JP–A–01 258 228 (Sony Corp) 16 Oct. 1989.

*Primary Examiner*—Ali Neyzari
*Attorney, Agent, or Firm*—Lerner, David, Littenberg, Krumholz & Mentlik

[57] ABSTRACT

A method of writing data simultaneously on a plurality of tracks of an optical disk, comprises providing an array of light sources, each light source being independently modulated, providing means to determine the position of each light source with respect to the center of a given track, and varying the intensity of each light source so as to generate a plurality of writing light beams, each generated by a plurality of adjacent light sources, each of the said light beams having the desired width, intensity and position on the written track.

12 Claims, 8 Drawing Sheets

U.S. PATENT DOCUMENTS

| | | | |
|---|---|---|---|
| 5,293,569 | 3/1994 | Koyama | 369/112 |
| 5,295,125 | 3/1994 | Oonishi et al. | 369/44.29 |
| 5,313,441 | 5/1994 | Imai et al. | 369/44.14 |
| 5,365,535 | 11/1994 | Yamaguchi et al. | 369/121 X |
| 5,394,385 | 2/1995 | Sakurada et al. | 369/44.23 |
| 5,420,840 | 5/1995 | Bec | 369/44.14 |
| 5,426,623 | 6/1995 | Alon et al. | 369/32 |
| 5,438,563 | 8/1995 | Oshiba et al. | 369/124 |

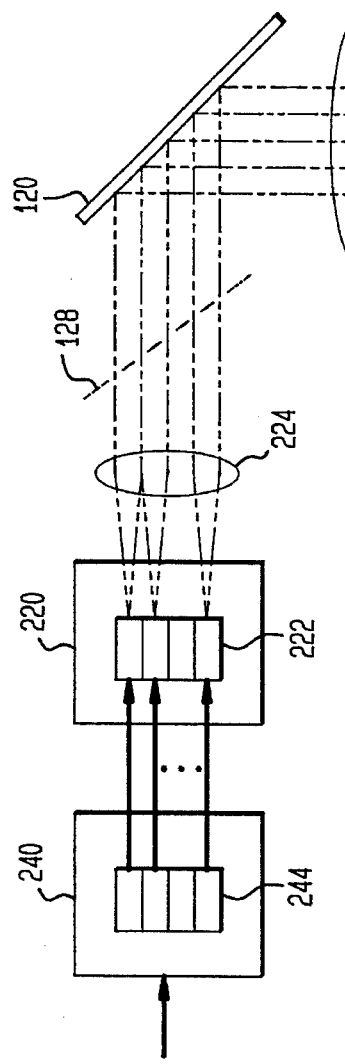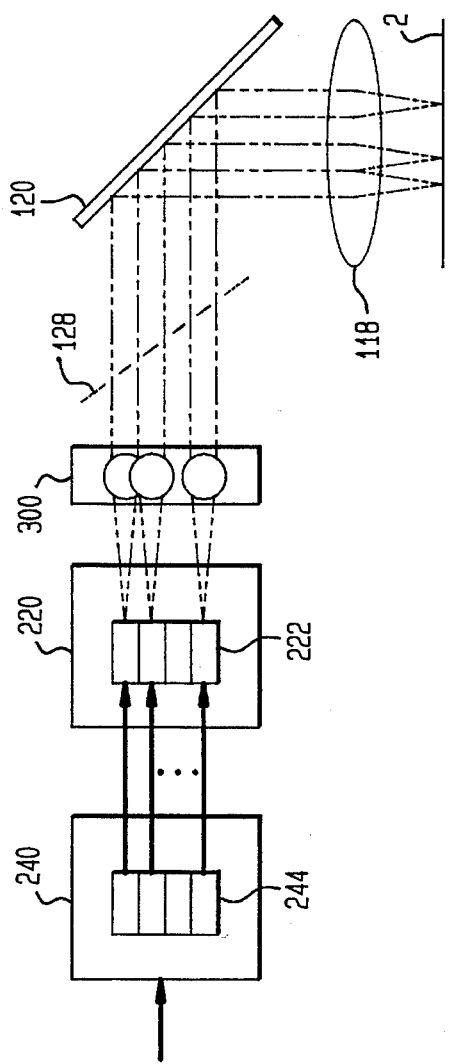

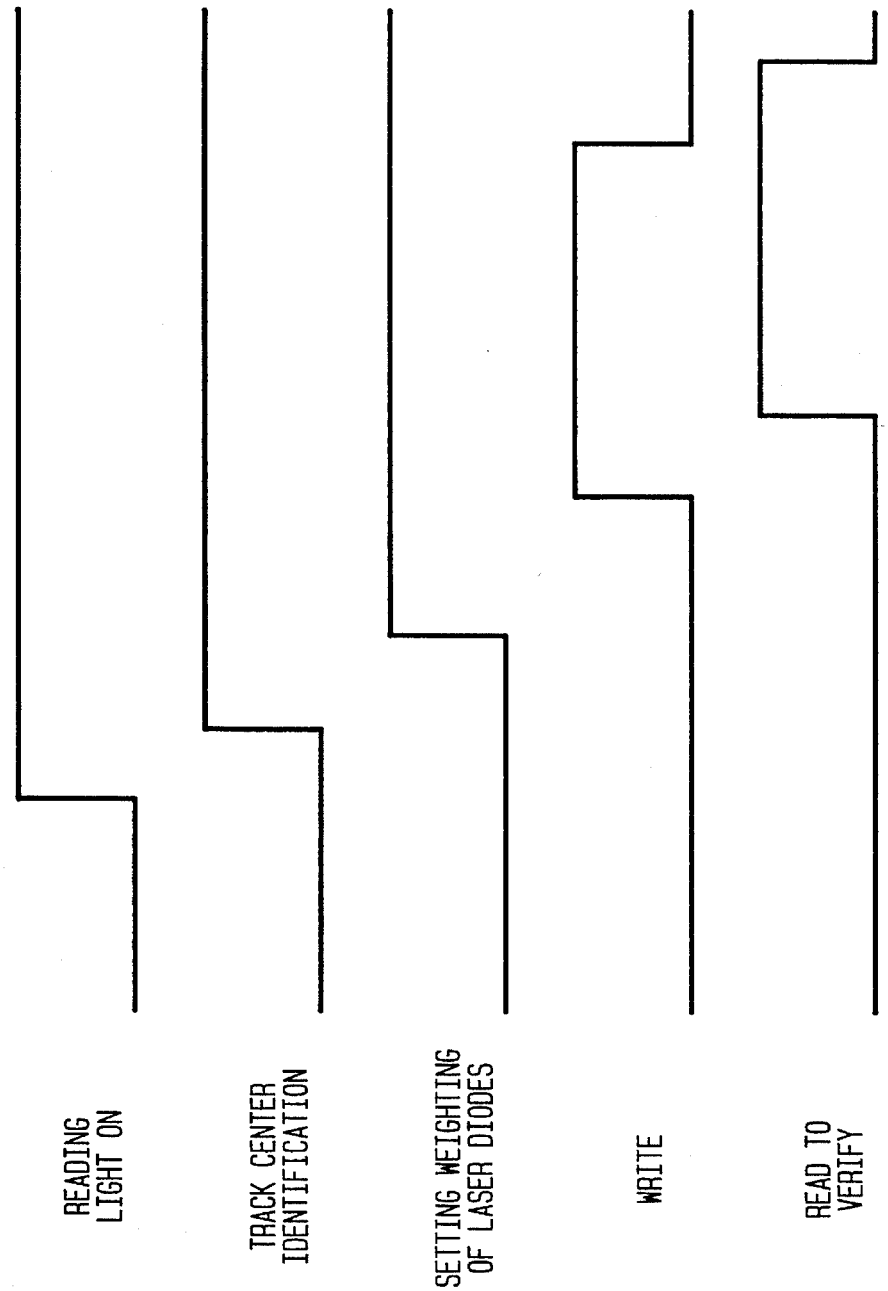

METHOD OF WRITING DATA SIMULTANEOUSLY ON A PLURALITY OF TRACKS OF AN OPTICAL DISK, AND APPARATUS THEREFOR

FIELD OF THE INVENTION

The present invention relates to optical disks technology. More particularly, the invention relates to a method of simultaneous writing data on a plurality of tracks of an optical disk.

BACKGROUND OF THE INVENTION

In a previous Israeli patent application No. 101,570 filed Apr. 10, 1992 by the same applicants herein (corresponding to European Patent Application No. 93105995.0 and to U.S. patent application Ser. No. 08/043,254, filed Apr. 6, 1993, now U.S. Pat. No. 5,426,623, the specification of which is incorporated herein by reference), an optical reading head for reading data tracks of optical disks, an apparatus enabling locking, tracking and reading data from many data tracks of an optical disk were described. This device comprises an optical apparatus fox- fast addressing of tracks on the disk, optical apparatus for imaging the tracks on a detector matrix comprising a plurality of detectors arranged in parallel lines, the said detector matrix being coupled to a plurality of shift registers, on which processing of the image is possible.

The said device further comprises signal processing means to receive the data generated by the detector matrix, and to translate the said data into data contained in data spots located on the disk.

The invention described in IL 101,570 is further directed to a method of accessing and reading data from an optical disk, which method comprises the steps of:

1) providing means for illuminating the required part of the disk and acquiring the optical image of a plurality of tracks;

2) providing a detector matrix comprising a plurality of detectors, each of the said detectors being capable of producing an output signal which is proportional to the intensity of the light detected by it;

3) causing an optical image corresponding to an illuminated area to fall on the said detector matrix;

4) transferring the output signal of the said detector matrix to image processing means;

5) determining position coordinates of the track center for each data track, by analyzing the output signal of the said detector matrix;

6) saving in memory means expected track center data, comprising position coordinates of the track center located by the said analysis of the output signal; and 7) if an actually detected track center is shifted with respect to the said expected track center, electronically moving the track center position.

According to one embodiment of the abovementioned invention, at the beginning of the operation a so-called "locking" operation is carried out, to determine the track center, and the coordinates of the track center initially found are used as the first value for the expected track center. Additionally, in another preferred embodiment, a number of track center values consecutively determined are considered, to permit statistical evaluation of drift and other system parameters.

As is apparent to a person skilled in the art, the ability to move the boundaries of the data strips electronically, by redefining the position of said boundaries and without the need for mechanical adjustment, permits to compensate for drift in the disk movement. This compensation is critical for reading many tracks simultaneously, and the ability to compensate quickly for any such drift is an important feature, which permits to process large amounts of data at high rates.

The head of the device as described therein can only read data in parallel, but cannot write data in parallel on many data tracks of the disk. Therefore, writing must be done by a conventional writing head, which writes data serially, one track at a time. This is a considerable disadvantage which limits the usefulness of the apparatus, particularly in cases where writing must be done rapidly.

It is an object of this invention to provide means by which it is possible also to write data simultaneously on plurality of tracks.

SUMMARY OF THE INVENTION

The method of writing data simultaneously on a plurality of tracks of an optical disk, according to the invention, comprises providing an array of light sources, each light source being independently modulated, providing means to determine the position of each light source with respect to the center of a given track, and varying the intensity of each light source so as to generate a plurality of writing light beams, each generated by a plurality of adjacent light sources, each of the said light beams having the desired width, intensity and position on the written track. According to a preferred embodiment of the invention the light sources comprise a plurality of laser diodes.

The invention provides for the generation of beams wherein the intensity of the light sources is varied so that their combined intensity exceeds the writing threshold value along the desired profile. Sub-threshold intensities are not considered to constitute a part of the beam profile, as they will not result in a writing on the disk.

Also encompassed by the invention is an apparatus for writing data simultaneously on a plurality of tracks of an optical disk, comprising an array of light sources, means for independently modulate each of the said light sources, means for determining the position of each light source with respect to the center of a given track, and means for generating a plurality of writing light beams, each generated by a plurality of adjacent light sources, each of the said light beams having the desired width, intensity and position on the written track.

As will be appreciated by the skilled person, the ability to redefine the position of each track center in a multi track area by modulating the light sources without mechanical adjustment enables the precise writing of many tracks simultaneously even when there are small drifts in the disk position and track locations.

It should be noted that even when writing on a single track, some of the advantages of the invention are preserved, since no mechanical and precise servo mechanism is required. Thus, in another aspect, the invention is directed to a method of writing data on a track of an optical disk, comprising providing an array of light sources, each light source being independently modulated, providing means to determine the position of each light source with respect to the center of a given track, selecting a track on which data is to be written, and varying the intensity of each light source positioned within the selected track so as to generate a writing light beam by the combined effect of a plurality of adjacent light sources, the said light beam having the desired width, intensity and position on the written track.

The invention, in this aspect, also encompasses an apparatus for writing data on a track of an optical disk, comprising an array of light sources, means for independently modulate each of the said light sources, means for determining the position of each light source with respect to the center of a given track, means for selecting a track on which data is to be written, and means for varying the intensity of each light source positioned within the selected track so as to generate a writing light beam by the combined effect of a plurality of adjacent light sources, the said light beam having the desired width, intensity and position on the written track.

All the above and other characteristics and advantages of the invention will be better understood through the following description of illustrative and non-limitative preferred embodiments thereof.

BRIEF DESCRIPTION OF THE DRAWINGS

FIG. 6a illustrates an illumination device according to one embodiment of the invention;

FIG. 6b illustrates an illumination device according to another embodiment of the invention;

FIG. 11 illustrates the sequence of the writing operations;

DETAILED DESCRIPTION OF THE INVENTION

In order to better appreciate the invention, some preferred embodiments of IL patent application No. 101,570 will be briefly described hereinafter.

Figure 1:
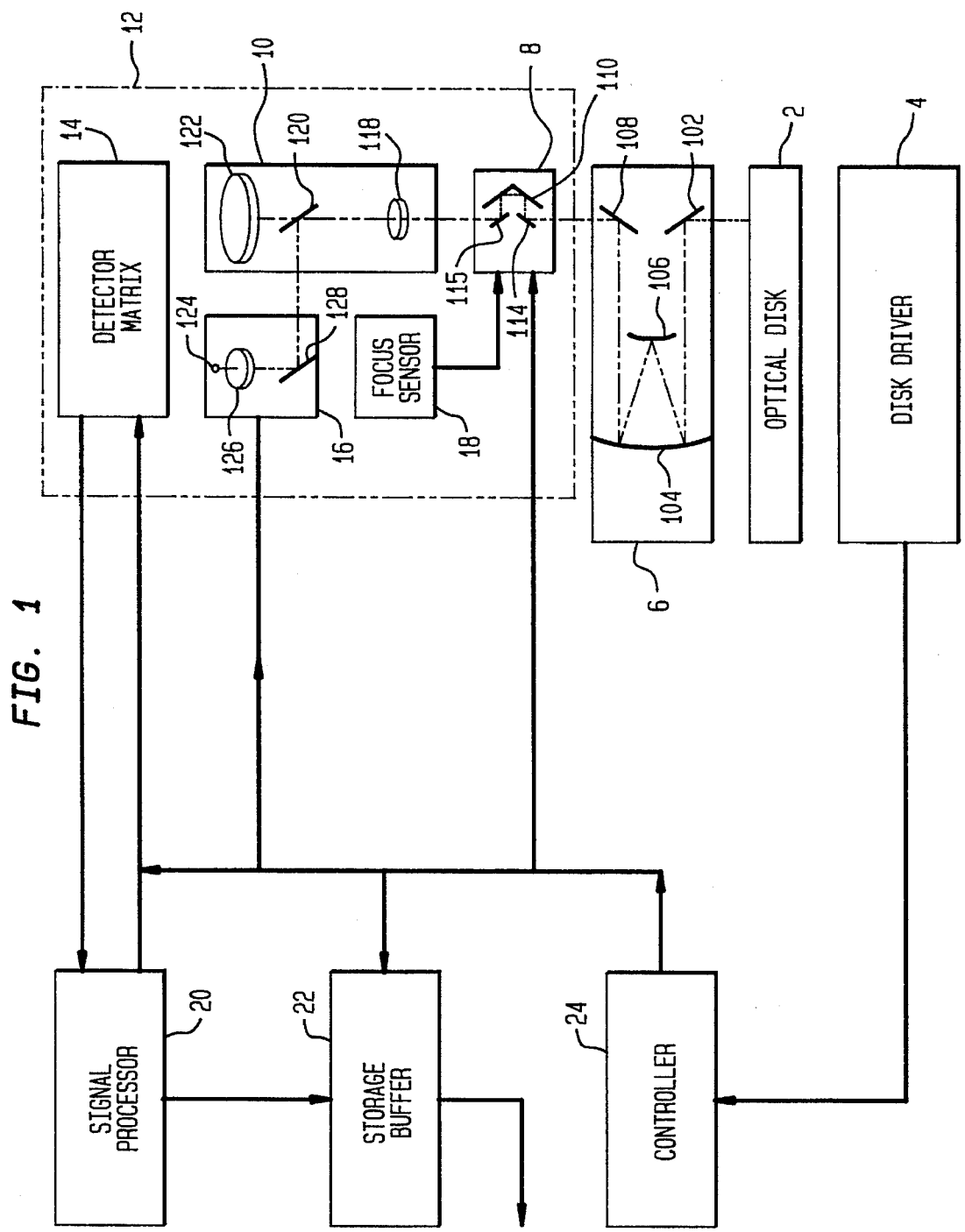
FIG. 1 schematically shows the main modules of the preferred embodiment of the invention of IL 101,570.

In FIG. 1, the preferred embodiment of the system for disk searching and reading is described. An optical disk 2 to be scanned by the system is placed in optical disk driver 4 which rotates the disk, reads the timing and tracking spots on one of the disk's tracks and sends timing signals to system controller 24. Above disk 2 there is an optional relay optics unit 6 that images the disk to intermediate image above it. The relay optics has a long optical path which creates enough space for optical elements such as the step and focus unit 8 or folding mirrors for multi disk configuration. The data is acquired by one or more reading heads 12, each one comprises of microscope 10, light source 16, detector matrix 14, focus sensor 18, and step and focus unit 8 as described in IL 101,570. The disk is illuminated by a light beam that is emitted from light unit 16, focused by microscope 10 and relayed by relay optics 6 to generate a uniform area of non-coherent illumination on disk 2. The required tracks of disk 2 are imaged by microscope 10 on detector matrix 14. The electrical signal that is generated by detector matrix 14 is processed by signal processing module 20. This module detects the presence and location of the sets of data spots. Data spots information is sent to storage module 22 and after structuring, the data is sent to a computer system (not shown).

Figure 2:
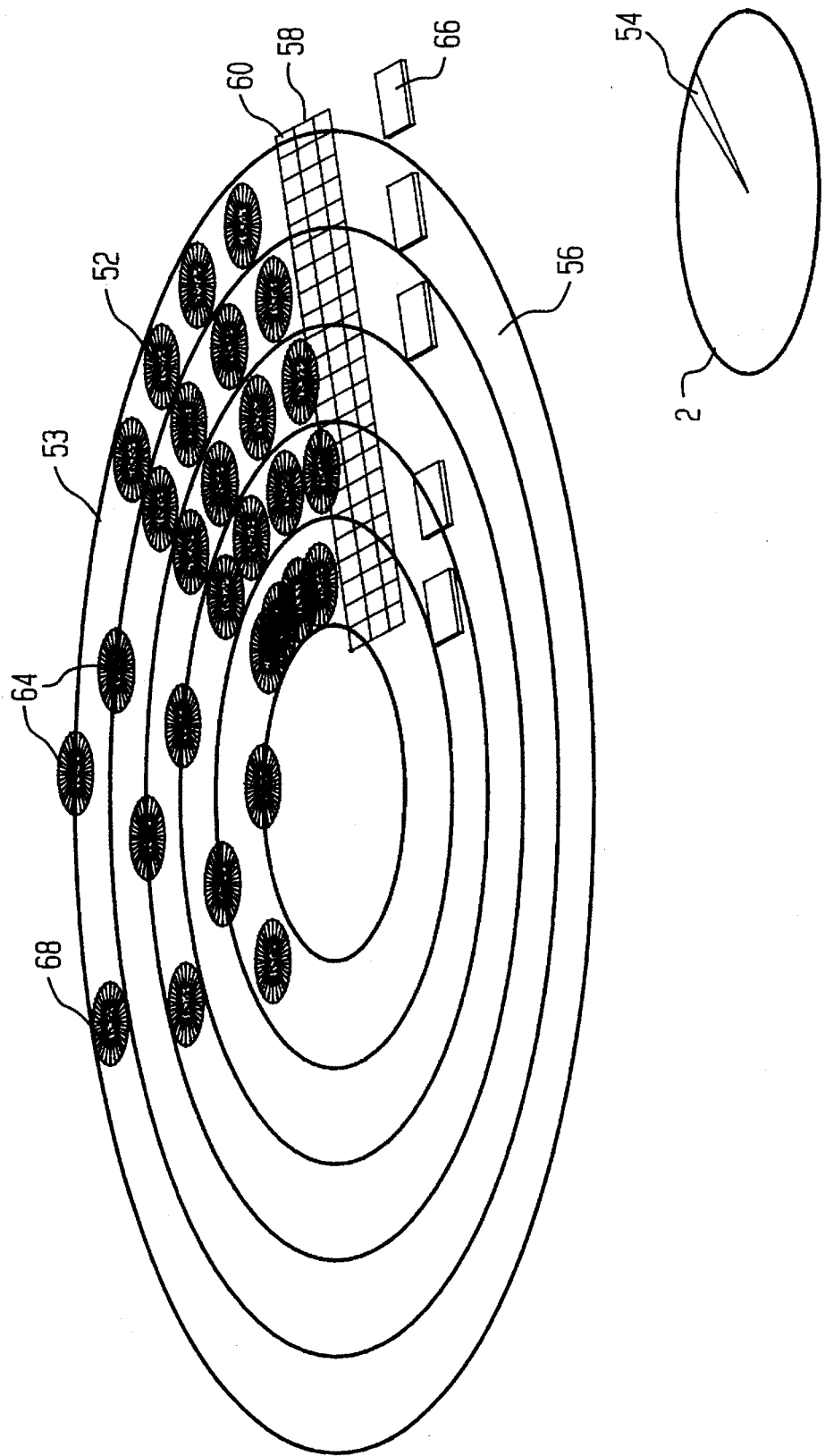
FIG. 2 illustrates the reading of a number of tracks according to IL 101570.

At any moment in time, each image of data spot 52 of FIG. 2 lies over a square that contains nXm detectors. This nXm sampling of a data spot enables to localize a data spot on the right track when the disk has a small radial movement. It also enables to detect the presence of two succeeding data spots that are barely resolved. Because of the radial movement of the disk, the tracks can be shifted with large amplitude. In order not to loose the shifted tracks, the rows of detectors have to be long enough to "see" the shifted tracks as well. For global shift of amplitude w and for track width d, additional 2.w/(d/m) detectors should be provided in the detector matrix 14. Alternatively, only small and fast shifts are compensated for electronically, and large slow shifts are mechanically compensated.

Figure 3:
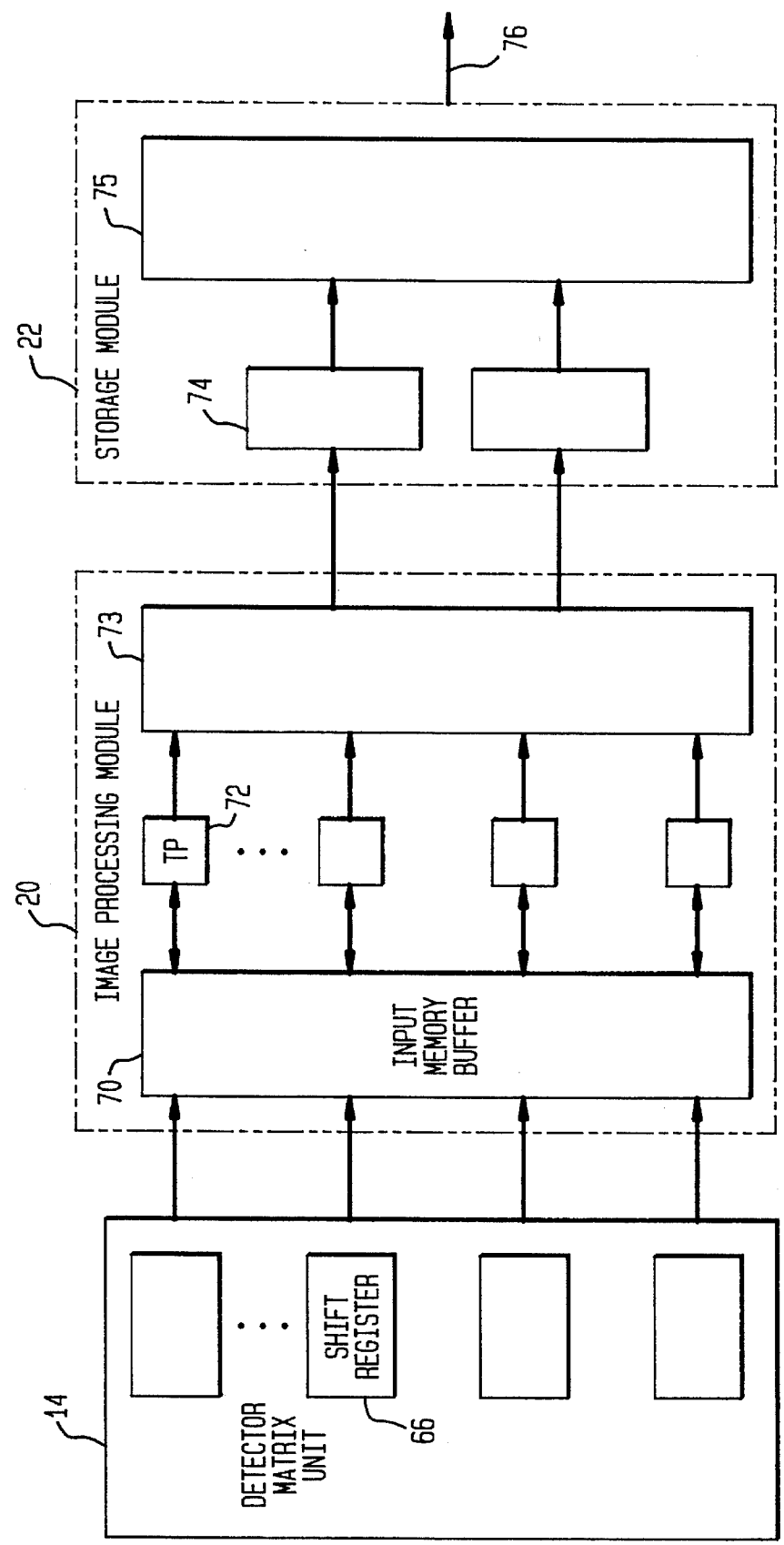
FIG. 3 is a schematic representation of one possible signal processing unit, according to IL 101570.

FIG. 3 schematically illustrates image processing module 20. The module receives signals from detector matrix unit 14. The data from each shift register 66 of detector matrix 14 is fed to input memory buffers 70. Input memory buffers 70 are connected to a set of track processors (TP) 72 that detect the presence of image spots. The input memory buffer can also serve as a multiplexing unit transferring only a section of the detector outputs into the processors. By processing spots, the processing rate is reduced by the number of detectors "covered" by a spot. In the preferred embodiment of the invention a common reduction is by a factor of 9 from a pixel rate of 320M/sec. Track detectors 72 align the spots on their right tracks. This alignment is done locally for small radial movement of the disk. More global alignment is done by system controller 24.

In the locking mode, the initial location of the center of the track is computed and set. TP 72 calculates the half-width distance between two of the nearest successive tracking spots 64 (in FIG. 2) of the sector header, and confirms this with the timing spot(s) 68 on the track center. If the disk is not formatted with tracking spots the locking is performed on the data spots, or on special pregroved track markers, if such exist.

In the preferred embodiment of the invention, the sampling resolution is three pixels across each track. In the tracking mode, the maximum (or minimum) value across the track (over 4 pixels) is computed in sub-pixel resolution. The location of the maximum is recorded along the track. Any shift in the position of the maximum, relative to the current track center, is detected. The new track center is computed and the corresponding pixel nearest the center of the track is tagged as the central pixel of the track. For non sampled tracks, where the tracking points do not exist, the locking and tracking are performed on the track data or on special marks, if such exist.

The mechanism for detecting the peaks in the tracking and locking process is further described below.

The peak detection mechanism is quite similar to the edge detection mechanism, "peak location" meaning the location along a row of pixels across a track and between two track edges, where the maximum (or minimum) intensity value is located.

Figure 4:
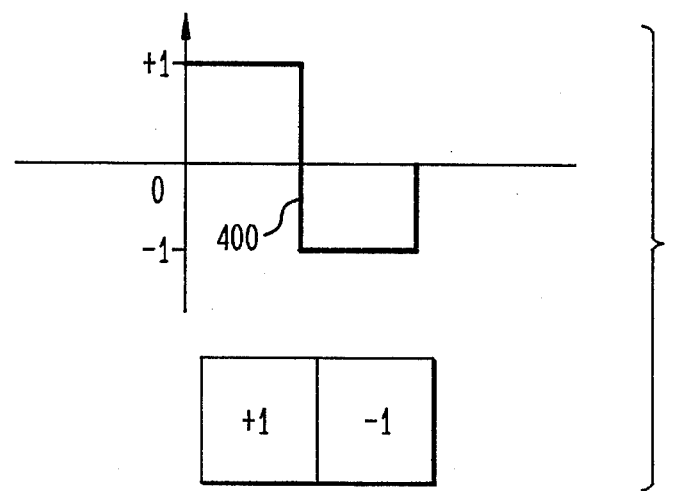
FIG. 4 illustrates the peak detection operator according to IL 101570.

Referring to FIG. 4, in the preferred embodiment of the invention, the operator used for the peak detection is the First Difference operator 400, which is a one-dimensional operator consisting of two values: +1 and −1. Convolving the operator with pixels across the track direction, yields a convolved image comprising an array of positive, negative and possibly zero values. The zero-crossings between adjacent positive and negative values represents points of maxima and minima of the intensity levels. The gradient direction of the zero-crossing determines whether it is a minimum or a maximum. The exact position of each zero crossing is again computed in a sub-pixel accuracy, using interpolation. To reduce high-frequency noise it is possible to convolve the image with a one-dimensional low pass mask, across the tracks, before applying the First Difference operator.

Applying the first difference operator across track direction directly on the input signals has the disadvantage that neighboring pixels must be well calibrated. In order to alleviate this problem it is possible to apply first a first derivative type operator in the track direction, and then to search for the maximum (or minimum) value between the gradients in the cross track direction. To achieve higher stability in the results, the absolute value yielded by the first derivative operation are accumulated before comparison.

In the following description, the invention will be illustrated with particular reference to illustrative and non-limitative preferred embodiments.

The novel features of the invention are described with reference to FIGS. 6–12.

Figure 10:
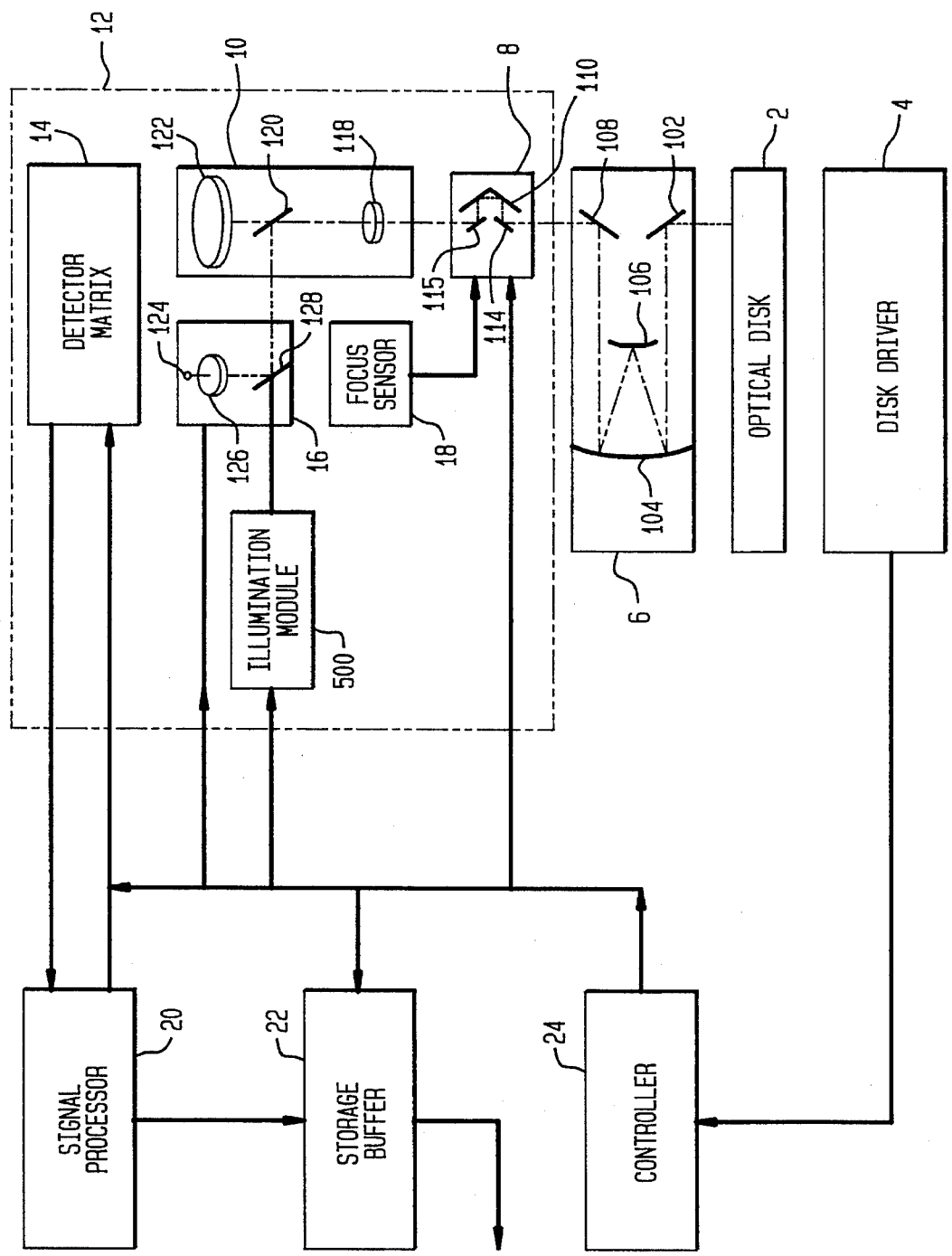
FIG. 10 schematically shows the main modules of one preferred embodiment of the invention.

FIG. 10 illustrates the integration of the write illumination unit 500 into the read head apparatus. The illumination unit is controlled by the system controller 24 and emits the write beams through the beam splitter 128. FIGS. 6a and 6b show the write illumination module 500 in detail. The light beam from writing light source 222 is focused by objective lens 118 to form an image on the disk of the laser diodes array 222. The sum of their light intensities is the desired writing spot of that track. Detector matrix 14 uses the reading beam to detect and locate the data tracks of the disk (as described earlier). The track-locking data is used by the system controller to operate the diode lasers of writing laser array 222. By proper weighing of the current of each laser diode, the resulting beam is shaped so that the writing spot is centered on the right track and its width is of the desired value. By using multiple laser diodes, tracks can be written in parallel in such a way that each track has the writing spot of the desired width, intensity and position.

Referring now to the write operation, as illustrated in FIG. 6a, writing laser diode 222 of writing light source 220 is comprised of a row of individually addressable laser diodes. Each laser diode is driven by one of the laser diode drivers of writing light source driver 244. The light beam from each laser diode is collimated by lens 224, reflected by beam splitter 120 toward objective lens 118. The lens focuses the collimated beam and generates an image of the diode laser array 222 on the disk. The focal length of lens 224 is chosen so that together with objective lens 118, a desired magnification (in fact, demagnification) of the laser diode array 222 is achieved. By this magnification, the number of the images of the laser diodes included in the data track of the disk is determined. In FIG. 6b the lens 224 is replaced by a lens array 300. In this embodiment, multiple lenses are used to collimate the light, instead of a single large lens. This embodiment has the advantage of eliminating off axis aberration when there is a large number of lasers, i.e., a large field of view.

The width and the intensity profile of the image of each laser diode of the writing laser diode array 222 is determined by the diffraction pattern of the image generated by the optical system. This pattern is determined by the numerical aperture of the objective lens and by the wavelength of the beam.

Figure 7:
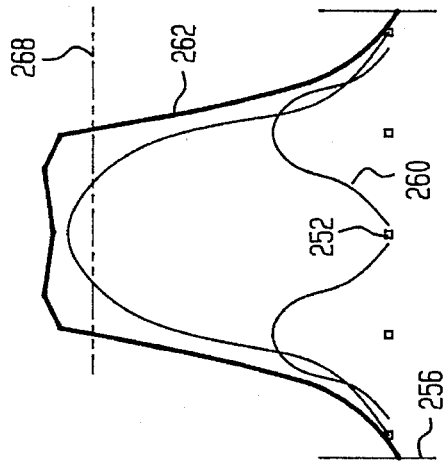
FIG. 7 shows spots as seen on a disk.

In FIG. 7, the relation between track, images of the laser diodes and their diffraction pattern is described. The width of track 250 includes several images 252 of laser diode, each generating a diffraction pattern 254. For separation between images 252 of the laser diode that is smaller than the width of the diffraction pattern 254 of each image, there will be partial overlapping between diffraction patterns of neighboring laser diodes. The resulting intensity profile is a function of this overlapping and of the degree of coherence of the beam. At each point the intensity is the sum of the intensity of the overlapping diffraction patterns plus a term which is proportional to the degree of coherence. By setting the intensity of each laser diode relative to its distance from the track center, the intensity profile of the resultant beam is controlled. Because in the writing process light intensity must be above a threshold in order to affect the optical disk, the only important part of the intensity profile is that which is above the writing threshold 268.

Figure 8:
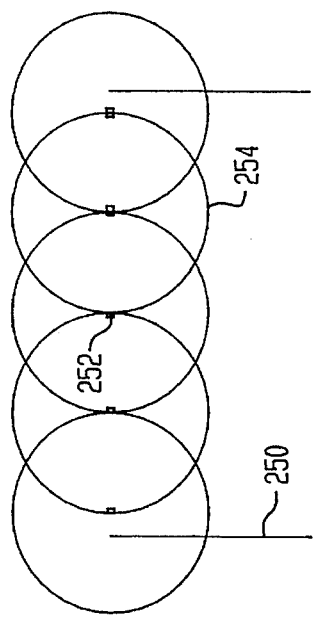
FIGS. 8 and 9 show light intensities obtained from light spots of FIG. 7.
Figure 9:
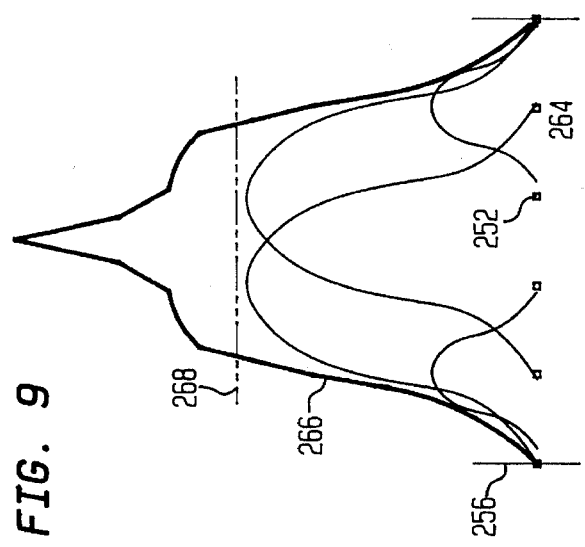

FIG. 8 is an example of the light intensity profile for five images of laser diodes that are symmetrically laid within the track. Within the track 256, each image 252 of laser diode generates a diffraction pattern that has intensity profile 260. The resultant sum 262 of the intensities profiles is centered on the track 256. Then the track is shifted laterally so that images of the laser diodes are not centered symmetrically around the track center, the relative weighing of the light intensity of each laser diode is changed so that the resulting sum of intensities has an intensity profile that is centered properly on the track. FIG. 9 is an example of such a shifted track. The relative intensity 264 of the diffraction pattern results in centered profile 266. By proper control of the light intensity of each laser diode, the width, intensity and center of the resultant profile at the threshold level can be controlled.

The tracking and read operations are used for controlling the write position and for verifying the correctness of the written information. FIG. 11 illustrates the sequence of operations associate with the writing. First the read illumination is turned on. The tracking processor identifies with high accuracy the position offsets of the track centers. These position offsets are used as input to a look-up table out of which the weightings of the laser diodes is taken. In parallel with the writing, the read operation verifies the correctness of written data. Continuous update of the weighting is done through the writing to correct for small position translation.

Figure 12:
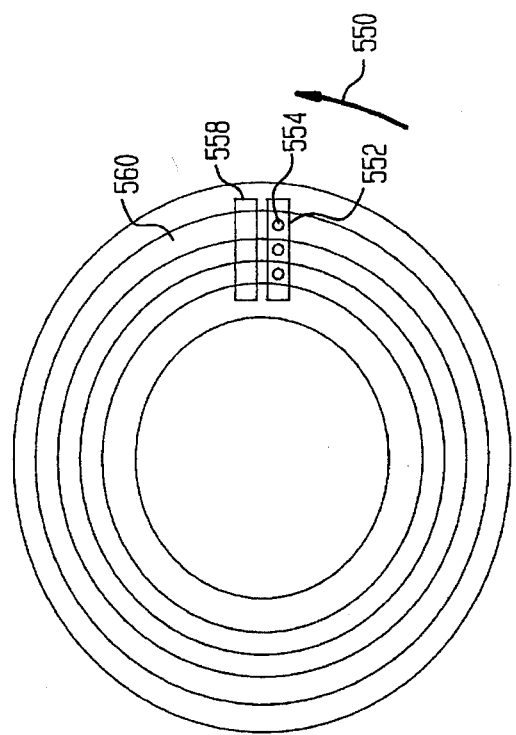
FIG. 12 shows the position of the read and write illuminations on the disk.

FIG. 12 illustrates the spatial relations on the disk 560 between the read illumination 558 and the write illumination 552. As the disk rotates in the direction 550 the data spots 554 are being aligned and written using the tracking information. The written data is then verified with the read illumination 558. The distance between the read and the write illuminations is small enough so that no significant translation errors are created.

The following examples will further illustrate the invention, but are not intended to limit it in any way.

EXAMPLE 1

This example illustrates the writing of data representing a picture from an optical disk, according to the invention. A Roentgen picture contains 2000×2000 pixels. Every pixel contains 12 bits. Each picture, therefore, contains 48 Mbit=6 Mbyte.

Writing the picture to a conventional optical disk, having an addressing time of 70 msec, and a data writing rate of 1.25 Mbyte/sec, requires a time of:

[6 MByte/(1.25 Mbyte/sec)]+0.07 sec=4.87 sec.

Writing the picture to a system according to the invention, having an addressing time of 15 msec, and a data writing rate of 20 Mbyte/sec, requires a time of:

[6 MByte/(20 Mbyte/sec)]+0.015 sec=0.315 sec.

Therefore, the invention permits the writing of such a picture at a speed greater by one order of magnitude.

EXAMPLE 2

Figure 5:
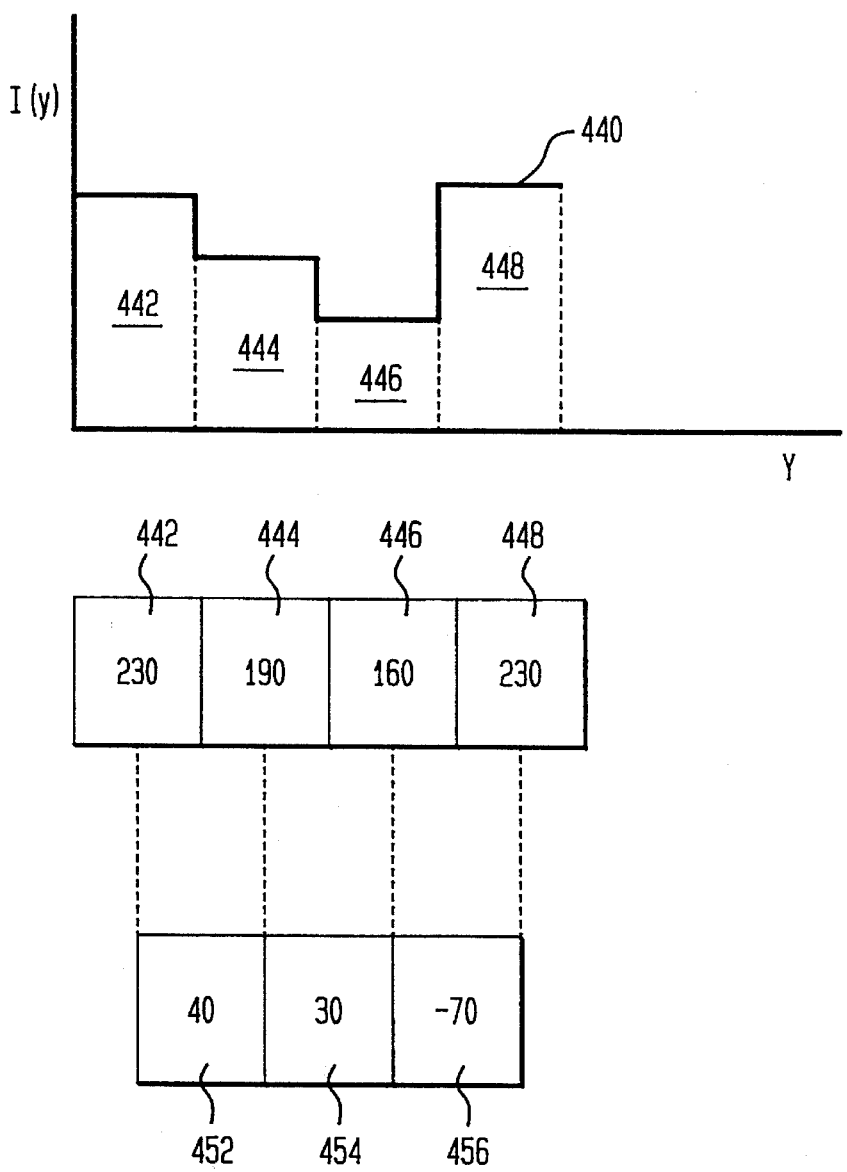
FIG. 5 illustrates the peak detection process according to IL 101570.

FIG. 5 shows a digitized image function 440 of four pixels across a track:
Pixel 442 has a value of 230;
Pixel 444 has a value of 190;
Pixel 446 has a value of 160;
Pixel 448 has a value of 230.

Applying the First Difference to this signal produces four new pixels with signed values and shifted in space by half a pixel: Pixel 452 represents the difference between pixels 442 and 444 and thus is located in space exactly between them. It has a value of 40. Similarly, Pixel 454 has a value of 30, Pixel 456 has a value of −70.

The zero cross lies between pixels 454 and 456, viz., within Pixel 446. The exact location is 30/(30+70)=0.3 pixel.

Hence, the track center is located at pixel 446, 0.3 pixel from its left boundary.

The above description of preferred embodiments has been given for the purpose of illustration, and should not be construed as a limitation of the invention in any way. Many changes can be effected in the method and apparatus of the invention. For instance, different light sources can be used, or different apparatus geometry can be devised, all without exceeding the scope of the invention.

We claim:

1. A method of writing data simultaneously on a plurality of tracks of an optical disk, comprising providing an array of light sources, each of said light sources being independently modulated, providing means to determine the position of each said light source with respect to the center of a given track, and varying the intensity of each said light source so that their interference generates a plurality of writing light beams, each of said writing light beams being positioned so that it illuminates the center position of a single track, each of said writing light beams being generated by a plurality of adjacent said light sources, each of said light beams having the desired intensity and position on the written track, and wherein two adjacent writing light beams do not substantially interfere with one another.

2. A method according to claim 1, wherein the light sources comprise a plurality of laser diodes.

3. A method according to claim 1, wherein the light beams are projected by multiple lenses.

4. A method according to claim 1, wherein the intensity of the light sources is varied so that their combined intensity exceeds the threshold value along the desired profile.

5. A method according to claim 1, wherein at least one light beam is caused to illuminate each track on which writing takes place.

6. An apparatus for writing data simultaneously on a plurality of tracks of an optical disk, comprising an array of light sources, means for independently modulating each of said light sources, means for determining the position of each said light source with respect to the center of a given track, and means for generating a plurality of writing light beams, each of said writing light beams being positioned so that it illuminates the center position of a single track, each of said writing light beams being generated by a plurality of adjacent said light sources, each of the said light beams having the desired intensity and position on the written track, and wherein two adjacent writing light beams do not substantially interfere with one another.

7. An apparatus according to claim 5, wherein the light sources comprise a plurality of laser diodes.

8. A method of writing data on a track of an optical disk, comprising providing an array of light sources, each of said light sources being independently modulated, providing means to determine the position of each said light source with respect to the center of a given track, selecting a track on which data is to be written, and varying the intensity of each said light source positioned within the selected track so as to generate a writing light beam by the combined effect of a plurality of adjacent said light sources, said light beam being positioned so that it illuminates the center position of a single track and having the desired intensity and position on the written track, and wherein two adjacent writing light beams do not substantially interfere with one another.

9. A method according to claim 8, wherein the light sources comprise a plurality of laser diodes.

10. An apparatus for writing data on a track of an optical disk, comprising an array of light sources, means for independently modulating each of said light sources, means for determining the position of each said light source with respect to the center of a given track, means for selecting a track on which data is to be written, and means for varying the intensity of each said light source positioned within the selected track so as to generate a writing light beam by the combined effect of a plurality of adjacent said light sources, said light beam being positioned so that it illuminates the center position of a single track and having the desired intensity and position on the written track, and wherein two adjacent writing light beams do not substantially interfere with one another.

11. A method according to claim 1 or 8, wherein a reading head capable of simultaneously reading the plurality of tracks being written is positioned after the writing head to verify the correctness of the data written on the optical disk by the writing head.

12. Apparatus according to claim 6 or 10, further comprising a reading head capable of simultaneously reading the plurality of tracks being written, the said reading head being positioned after the writing head in the direction of data writing.

* * * * *

UNITED STATES PATENT AND TRADEMARK OFFICE
CERTIFICATE OF CORRECTION

PATENT NO. : 5,592,444
DATED : January 7, 1997
INVENTOR(S) : Alon et al

It is certified that error appears in the above-identified patent and that said Letters Patent is hereby corrected as shown below:

Column 1, Line 24, change "fox-fast" to read --for fast--.

Signed and Sealed this

Twentieth Day of May, 1997

Attest:

BRUCE LEHMAN

Attesting Officer

Commissioner of Patents and Trademarks